# 2,802,720

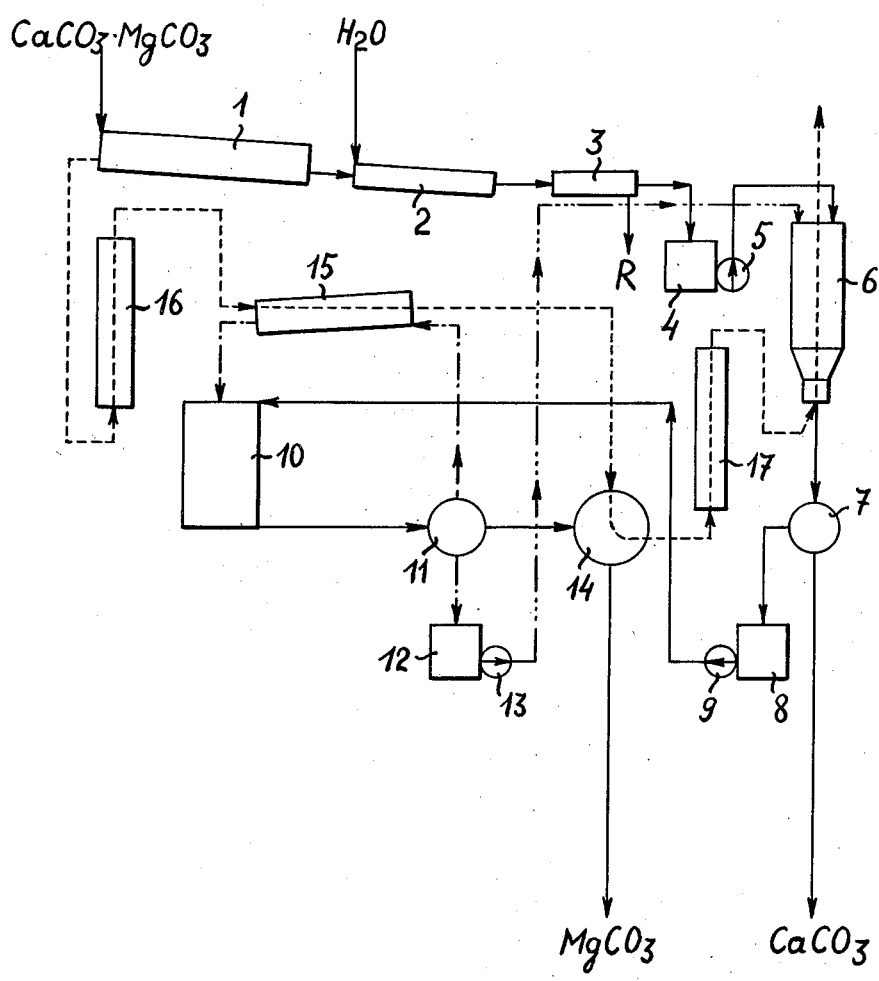

PROCESS FOR MAKING MAGNESIUM CARBONATE USING HYDRATED MAGNESIUM CARBONATE AS SOURCE OF MAGNESIUM OXIDE PRECIPITATING AGENT

Remo A. Opatowski, Rome, Italy

Application February 20, 1953, Serial No. 338,121

Claims priority, application Italy February 23, 1952

4 Claims. (Cl. 23—67)

It is known that the processes adopted usually for the extraction of magnesium carbonate from the dolomite ($CaCO_3 \cdot MgCO_3$) are based on the following working cycle:

= calcination of the dolomite between 1000 and 1100° C. and formation of calcium and magnesium oxides;

= transformation of the oxides into calcium and magnesium hydroxides, by action of water;

= treatment of the two hydroxides suspension with carbon dioxide and consequent precipitation of insoluble calcium carbonate, while the magnesium is dissolved in form of bicarbonate;

= separation of the calcium carbonate from the solution and successive precipitation of the magnesium carbonate by boiling the solution.

The processes that are based upon the above outlined cycle present some technical and economical drawbacks due to the low solubility of the magnesium oxide in water that is saturated with carbon dioxide, said solubility being of about 0.8% of MgO at ordinary pressure. Consequently the precipitation of $MgCO_3$ at the ebullition, from the magnesium bicarbonate solution, requires a high heat consumption which, in its turn, renders it necessary to install large boilers.

The above mentioned drawbacks have been partially overcome by the Pattison process which is the most frequently applied for the industrial production of magnesium carbonate according to which the dissolution of the magnesium hydroxide in water by means of carbon dioxide takes place under a pressure of 5 to 6 atmospheres in an autoclave and thus solutions are obtained containing about 2.5% of MgO. This concentration of magnesium oxide is however always low and the heating and boiling of the solution require still a considerable heat consumption.

In addition to the above, the use of autoclaves, besides increasing the cost of the plant, renders the operating cycle discontinuous.

The process according to the invention is characterised by the fact:

(a) That the working is effected in a continuous cycle, according to the operating diagram shown in the attached drawing;

(b) That the operations take place at atmospheric pressure, without the employment of autoclaves;

(c) That the liquids of the cycle are caused to react without heating same.

The precipitation of the magnesium carbonate from the bicarbonate solution is effected at room temperature by the addition of finely subdivided magnesium oxide which promotes the precipitation of trihydrated magnesium carbonate according to the reaction $$Mg(HCO_3)_2 + MgO + 5H_2O = 2(MgCO_3 \cdot 3H_2O) \quad (A)$$

By assuming to start from one mol of dolomite ($CaCO_3 \cdot MgCO_3$) which during the process is transformed into $CaCO_3$ and $Mg(HCO_3)_2$, according the reaction (A), a precipitate of 2 mols of trihydrated magnesium carbonate $2(MgCO_3 \cdot 3H_2O)$ is obtained. The half of the precipitated amount, viz 1 mol of trihydrated magnesium carbonate, corresponding to the magnesium contained in the starting dolomite is heated to about 200° C. in a rotating cylinder provided with a continuous discharge and thus the trihydrated magnesium carbonate is transformed into anhydrous magnesium carbonate ($MgCO_3$). The amount of $MgCO_3$ thus obtained constitutes the final product and is taken out of the cycle. The remaining half, viz. 1 mol, of trihydrated magnesium carbonate is calcined between 500 and 600=C in a rotating oven in order to form again MgO, according to the following equation:

$$MgCO_3 \cdot 3H_2O + Heat = MgO + CO_2 + 3H_2O \quad (B)$$

MgO is again returned into the cycle for the treatment of a fresh amount of magnesium bicarbonate solution according to the reaction (A). The calcination according to the reaction (B) is effected preferably by means of the hot gases coming out of the calcining oven for the dolomite, viz. by means of recovery heat.

Example and description of the working cycle according to the annexed drawing:

An amount of 2400 kgs. of dolomite containing about 20% of MgO and 5% of insoluble impurities is crushed to nut size and is introduced into a rotating oven 1 where it is calcined at temperatures between 1000° and 1050° C. for 15 minutes. The calcium and magnesium oxides formed during the calcination, by coming out of the oven fall into a rotating cylinder 2, made of iron or stainless steel, where they are subjected to a finely divided water spray. Thus the oxides are hydrated and the pieces fall easily to powder and are transformed without formation of insoluble clots in a fluid suspension of hydroxides of calcium and magnesium, which is sufficiently concentrated as to not require to be subjected to a further concentration before being subjected to the subsequent operations. The suspension of the hydrates is passed through an oscillating sieve 3 in order to eliminate the non-hydrated residues and the impurities of the starting material (which are indicated by R on the drawing). The liquid containing in suspension the calcium and magnesium hydroxides passes through the sieve, is collected in a reservoir 4 and is introduced by means of a pump 5 into the top of a carbonation tower 6 where also a solution of magnesium bicarbonate is introduced. This solution, which contains the equivalent of 0.15% of MgO, is taken out of the working cycle and constitutes the mother liquor of a preceding precipitation of trihydrated magnesium carbonate.

The two liquids mix together in the top part of the tower and flow downwardly. From the bottom of the tower are let in counter-current the combustion gases containing carbon dioxide coming out of the two ovens 1 and 15 and previously purified and cooled by passing through a coke tower 16 and a water tower 17.

In the tower 6 the precipitation of the calcium carbonate ($CaCO_3$) and the solution of magnesium hydroxide take place at the same time and a solution of magnesium bicarbonate is formed which flows out of the tower bottom at a concentration of about 0.75%, calculated as MgO, while the excess gases are let out through the top to the atmosphere.

Both the feeding of the tower and the outlet of the suspension of calcium carbonate into the solution of magnesium bicarbonate from the bottom of the tower are regulated in such a manner that the calcium and magnesium hydroxides are subjected to the action of the carbon dioxide for about 20 minutes. The magnesium bicarbonate solution containing in suspension the calcium carbonate is discharged from the tower 6 into a centrifugal separator 7 which in its turn discharges automatically in a continuous manner the calcium carbonate and leads the magnesium bicarbonate solution into a tank 8. The magnesium bicarbonate solution is fed by means of a pump 9 into a precipitator 10 provided with a stirrer. In this precipitator are added, while continuously stirring, 500 kgs. of magnesium oxide coming from oven 15. Thus trihydrated magnesium carbonate is precipitated in a crystalline form which can be easily separated from the mother liquor by filtration or better by centrifugation. The suspension is introduced into a centrifugator 11 acting also as extractor of water from the magnesium carbonate and from which the magnesium carbonate in crystal form is discharged practically free of humidity while the mother liquor is a magnesium bicarbonate solution containing 0.15%, calculated as MgO, and which is led into the tank 12 from which, through pump 13, as said, is led again into the cycle by being introduced into the carbonatation tower 6.

The centrifugated solid mass is subdivided continuously and automatically into two fractions, one of which is fed into the calcining oven 15, which functions at temperatures of 500°–600° C. At these temperatures the hydrated magnesium carbonate is decomposed to oxide, the output being of about 500 kgs. MgO (see reaction B), which is led again into the cycle in the apparatus 10 where it is employed for precipitating a fresh magnesium bicarbonate solution according to reaction A.

The second fraction of the precipitated trihydrated magnesium carbonate coming from the centrifugation is heated to about 200° C. in a rotating cylinder 14 with continuous discharge. By this heating, the crystallisation water is eliminated so that the trihydrated magnesium carbonate is transformed into anhydrous magnesium carbonate with an output of about 93% with respect to the $MgCO_3$ contents of the dolomite employed as starting material, which means that from 2400 kgs. of dolomite about 930 kgs. of anhydrous magnesium carbonate are obtained.

Some technological characteristics of the process forming the object of the invention may be summarized as follows:

(a) The process does not require the use of autoclaves. This leads to a saving in the installation costs and to a reduction of the upkeep costs, while at the same time the discontinuity of the working cycle, which is inherent to the use of autoclaves, is avoided.

(b) In none of the steps a steam heating is required. Consequently it is not necessary to provide a boiler in the plant.

(c) Thanks to the precipitation of the magnesium carbonate in crystalline form, it is possible to separate the product by means of a centrifugal separator provided with an automatic continuous discharge of the solids. The centrifugal separator employed functions as extractor of water from the magnesium carbonate crystals which are discharged practically in a dry state. This constitutes an advantage with respect to the separation by filtration of the final product, as it is usually the case in other processes, where the separated products contain still a considerable amount of humidity for the elimination of which it is necessary to consume heat.

It is to be noted that the carbon dioxide produced is always in excess with respect to that coming out of the cycle, because the carbon dioxide which develops during the calcining of the mineral is added to that contained in the combustion gases of the oven 1.

The above outlined process may be performed, according to an alternative of the working cycle, as follows:

The dolomite is calcined at temperatures above the decomposition temperature of $MgCO_3$, but below that of the decomposition of $CaCO_3$, viz. between 600° and 900° and preferably by 700° C. By this temperature, only $MgCO_3$ is decomposed by evolving the corresponding amount of carbon dioxide, according to the reaction:

(C)

$$CaCO_3 \cdot MgCO_3 + (\text{Heat } 700° \text{ C.}) = CaCO_3 \cdot MgO + CO_2$$

As a difference from what happens in the case of the complete calcination of the dolomite to calcium and magnesium oxides, by the calcining between 600° and 900° a product is obtained which does not fall to powder during a subsequent treatment with water. In fact the calcined mineral maintains its original consistency and consequently the hydration of MgO takes place only at the surface of the calcined pieces and very slowly. In order to overcome this drawback the calcined material is finely ground, preferably in a wet state, before proceeding to dissolving MgO into $H_2O + CO_2$.

In practice, into the carbonatation tower 6 a suspension in water of the calcined powdered material is fed, where it is treated in counter-current with carbon dioxide-containing gases. The $Mg(HCO_3)_2$ solution thus formed is discharged, together with the residual $CaCO_3$ which contains the impurities of the mineral, into a decanter, where it usually decants rapidly. The liquid contains small amounts of solids in suspension, which are eliminated by centrifugation. All the successive treatments of the clear magnesium bicarbonate solution up to the obtainment of the final product are identical to those of the working cycle as described and shown in the annexed drawing.

It should be mentioned that, although it has been assumed that the final commercial product is anhydrous magnesium carbonate, it is apparent that this could be any magnesium compound obtainable from trihydrated magnesium carbonate, and for example magnesium oxyde. In this latter case, the whole trihydrated magnesium carbonate will be calcined to oxyde while one-half of the calcined product will be employed as magnesium bicarbonate precipitating reagent.

I claim:

1. A continuous cyclic process for the manufacture of pure magnesium carbonate and pure magnesium oxide from minerals containing the same which comprises: transforming the magnesium carbonate contained in the mineral into oxide by calcining the mineral, adding water at room temperature to the calcined product to form a suspension comprising magnesium hydroxide, said water being added in an amount sufficient to permit theoretically the complete dissolution of the magnesium calculated as magnesium bicarbonate, treating said suspension with carbon dioxide containing gas until all of the magnesium hydroxide has been dissolved in the form of magnesium bicarbonate, separating the magnesium bicarbonate solution from the insoluble residue, adding to the separated magnesium bicarbonate solution, without subjecting said solution to heating, an amount of magnesium oxide substantially equal to the calculated amount of magnesium oxide contained in said magnesium bicarbonate solution to precipitate substantially immediately as hydrated magnesium carbonate both the magnesium added as magnesium oxide and the magnesium present as magnesium bicarbonate, said magnesium oxide being prepared by heating said precipitated hydrated magnesium carbonate to a temperature not exceeding 600° C., stirring until the motor liquor contains no more magnesium bicarbonate than 0.15% by weight calculated as magnesium oxide, separating the precipitated hydrated magnesium carbonate from its mother liquor and dividing the product into two equal parts, drying one of said parts to obtain anhydrous magnesium carbonate, calcining the other part at a temperature not exceeding 600° C. until magnesium oxide is formed and recycling said magnesium oxide to the magnesium bicarbonate solution.

2. A continuous cyclic process according to claim 1, in which the water added to the calcined mineral is replaced at least in part by the mother liquor recycled following its separation from the precipitated hydrated magnesium carbonate.

3. A continuous cyclic process for the manufacture of pure magnesium carbonate and pure magnesium oxide from dolomite which comprises: crushing the mineral, calcining said mineral at temperatures of 1000° C. to 1050° C. until substantially all of the carbon dioxide has been evolved, adding water to the calcined product to form a suspension of calcium and magnesium hydroxide containing 0.75% by weight of magnesium hydroxide calculated as magnesium oxide, subjecting said suspension to treatment with carbon dioxide-containing gas until substantially all of the magnesium hydroxide has been dissolved in the form of magnesium bicarbonate and the calcium has been precipitated in the form of calcium carbonate, separating the solution of the magnesium bicarbonate from the precipitated calcium carbonate, adding to the separated magnesium bicarbonate solution under continuous stirring, without subjecting said solution to heating, an amount of magnesium oxide substantially equal to the amount of calculated magnesium oxide contained in said magnesium bicarbonate solution to precipitate substantially immediately in the form of hydrated magnesium carbonate both the magnesium added as magnesium oxide and present as magnesium bicarbonate, said magnesium oxide being prepared by heating said precipitated hydrated magnesium carbonate to a temperature not exceeding 600° C., stirring until the mother liquor contains no more magnesium bicarbonate than 0.15% by weight calculated as magnesium oxide, separating the solid precipitated hydrated magnesium carbonate from its mother liquor and dividing that solid product into two equal parts, drying one of said parts to obtain anhydrous magnesium carbonate, calcining the other part at a temperature not exceeding 600° C. until magnesium oxide is formed and recycling said magnesium oxide to the magnesium bicarbonate solution.

4. A continuous cyclic process for the manufacture of pure magnesium carbonate and pure magnesium oxide from calcium and magnesium carbonate-containing minerals, which comprises: crushing the mineral, calcining said mineral at temperatures from 600° C. to 900° C., grinding the calcined product to form a fine powder, adding water to the calcined powder to form a suspension containing 0.75% by weight magnesium hydroxide calculated as magnesium oxide, subjecting said suspension to treatment with carbon dioxide-containing gas until substantially all of the magnesium hydroxide has been dissolved in the form of magnesium bicarbonate while the calcium has been precipitated in the form of calcium carbonate, separating the solution of the magnesium bicarbonate from the precipitated calcium carbonate, adding to the separated magnesium bicarbonate solution under continuous stirring without subjecting said solution to heating, an amount of magnesium oxide substantially equal to the amount of calculated magnesium oxide contained in said magnesium bicarbonate solution to precipitate substantially immediately in the form of hydrated magnesium carbonate both the magnesium added as magnesium oxide and present as magnesium bicarbonate, said magnesium oxide being prepared by heating said precipitated hydrated magnesium carbonate to a temperature not exceeding 600° C., stirring until the mother liquor contains no more magnesium bicarbonate than 0.15% by weight calculated as magnesium oxide, separating the solid precipitated hydrated magnesium carbonate from its mother liquor and dividing the solid product into two equal parts, drying one of said parts to obtain anhydrous magnesium carbonate, calcining the other part at a temperature not exceeding 600° C. until magnesium oxide is formed and recycling said magnesium oxide to the magnesium bicarbonate solution.

References Cited in the file of this patent

UNITED STATES PATENTS

| | | |
|---|---|---|
| 654,393 | Handy | July 24, 1900 |
| 689,345 | Young | Dec. 17, 1901 |
| 734,030 | Young | July 21, 1903 |
| 1,034,330 | Young | July 30, 1912 |
| 2,358,818 | Miller | Sept. 26, 1944 |
| 2,414,980 | Schoenlaub | Jan. 28, 1947 |
| 2,574,652 | Miller | Nov. 13, 1951 |